United States Patent
Stengel et al.

(10) Patent No.: US 7,971,367 B2
(45) Date of Patent: Jul. 5, 2011

(54) CUT LENGTH INDICATOR

(76) Inventors: Stuart René Stengel, E. Moriches, NY (US); Jason Chartes Gonzalez, Douglaston, NY (US)

( * ) Notice: Subject to any disclaimer, the term of this patent is extended or adjusted under 35 U.S.C. 154(b) by 371 days.

(21) Appl. No.: 12/319,729

(22) Filed: Jan. 12, 2009

(65) Prior Publication Data
US 2009/0178292 A1  Jul. 16, 2009

Related U.S. Application Data

(60) Provisional application No. 61/010,817, filed on Jan. 11, 2008.

(51) Int. Cl.
*G01B 3/08* (2006.01)
(52) U.S. Cl. .......................................... 33/809; 33/613
(58) Field of Classification Search .................... 33/809, 33/347, 365, 370–371, 374, 379, 381–385, 33/451, 613
See application file for complete search history.

(56) References Cited

U.S. PATENT DOCUMENTS

| | | | | |
|---|---|---|---|---|
| 149,532 A * | 4/1874 | Sherwin | ........................ | 33/809 |
| 224,401 A * | 2/1880 | Derickson | ....................... | 33/809 |
| 230,640 A * | 8/1880 | Massey | ............................ | 33/478 |
| 307,321 A * | 10/1884 | Osborn | ............................ | 33/464 |
| 413,930 A * | 10/1889 | Driscoll | ............................ | 33/511 |
| 571,366 A * | 11/1896 | Hegarty | ............................ | 33/809 |
| 798,721 A * | 9/1905 | Wilson | ............................ | 33/468 |
| 1,488,482 A | 3/1924 | Eckman | | |
| 1,665,400 A * | 4/1928 | Bittner | ............................ | 33/501 |
| 2,232,824 A | 2/1941 | Maher | | |
| 3,015,164 A * | 1/1962 | Antell | ............................ | 33/473 |
| 3,250,010 A * | 5/1966 | Smith | ............................ | 33/679.1 |
| 3,394,459 A * | 7/1968 | Grant | ................................ | 33/7 |
| 3,492,737 A | 2/1970 | Swanson | | |
| 3,808,690 A | 5/1974 | Balder | | |
| 4,212,108 A * | 7/1980 | Jackson | ............................ | 33/501 |
| 4,471,532 A | 9/1984 | Francis | | |
| 4,621,431 A | 11/1986 | Fatool | | |
| 4,662,077 A | 5/1987 | Richardson | | |
| 4,882,846 A * | 11/1989 | Reed | ............................ | 33/464 |
| 5,343,628 A * | 9/1994 | Ham | ............................ | 33/608 |
| 5,367,783 A * | 11/1994 | Nygren | ............................ | 33/613 |
| 5,642,569 A | 7/1997 | Palmer | | |
| 5,735,058 A | 4/1998 | Jimenez | | |
| 5,915,810 A | 6/1999 | Cameron | | |
| 6,047,478 A | 4/2000 | Sowers | | |
| 6,076,267 A | 6/2000 | Gotoh | | |
| 6,085,434 A | 7/2000 | Mitchell | | |
| 6,128,824 A * | 10/2000 | Yang | ............................ | 33/511 |
| 6,226,881 B1 * | 5/2001 | Landauer | ........................ | 33/515 |
| 6,662,458 B1 | 12/2003 | Antonelli | | |
| 6,820,342 B2 | 11/2004 | Ramsthaler | | |
| 6,820,348 B2 * | 11/2004 | Brumbaugh | ................... | 33/613 |
| 6,836,969 B1 | 1/2005 | Bates | | |
| 7,073,267 B2 * | 7/2006 | Butler et al. | .................... | 33/203 |
| 7,204,031 B2 * | 4/2007 | Hanson | ............................ | 33/479 |

* cited by examiner

*Primary Examiner* — Amy Cohen Johnson
*Assistant Examiner* — Tania C Courson

(57) ABSTRACT

A distance-transferring device comprising a plurality of interconnected rails. Each rail, when extended, is self-supporting. Once the rails are extended and locked in place between two points, two planes, or one point and one plane, an accurate representation of a distance between the two points, two planes or one point and one plane is obtained. This distance can be transferred to another location without having to memorize a numerical measurement. Opposing abutting angled ends provide for both easy access into corners and a clear visual for when the abutting angled end contacts a plane or mark. A rotating component allows for operating the invention in more than one plane. A movable catch hooks onto an object such as wood moldings to facilitate the measurement transfer without adding any error to the distance being transferred. Extension stops prevent the rails from longitudinal separation. Bubble vials are provided for leveling both horizontally and vertically.

8 Claims, 7 Drawing Sheets

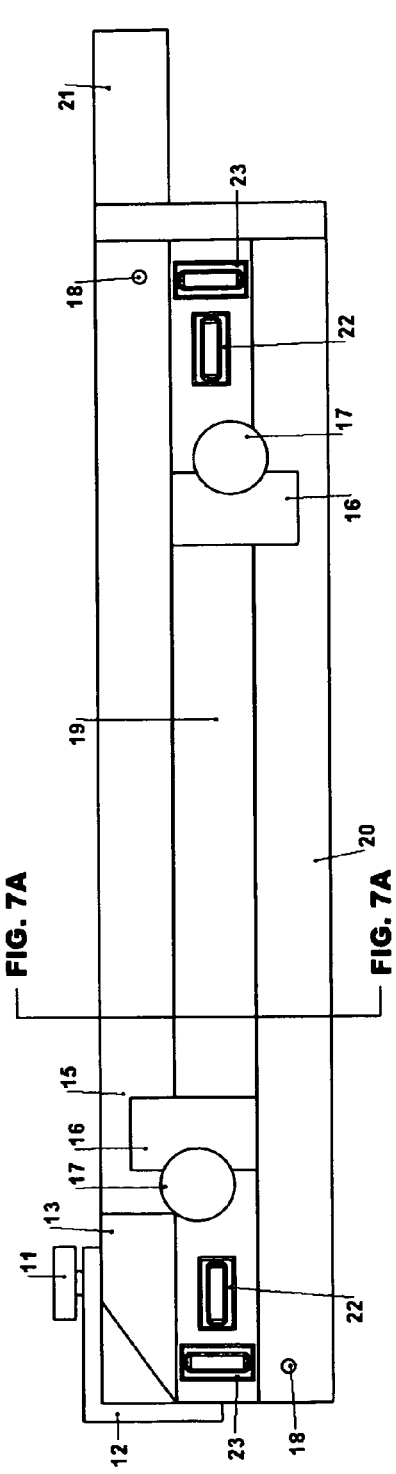
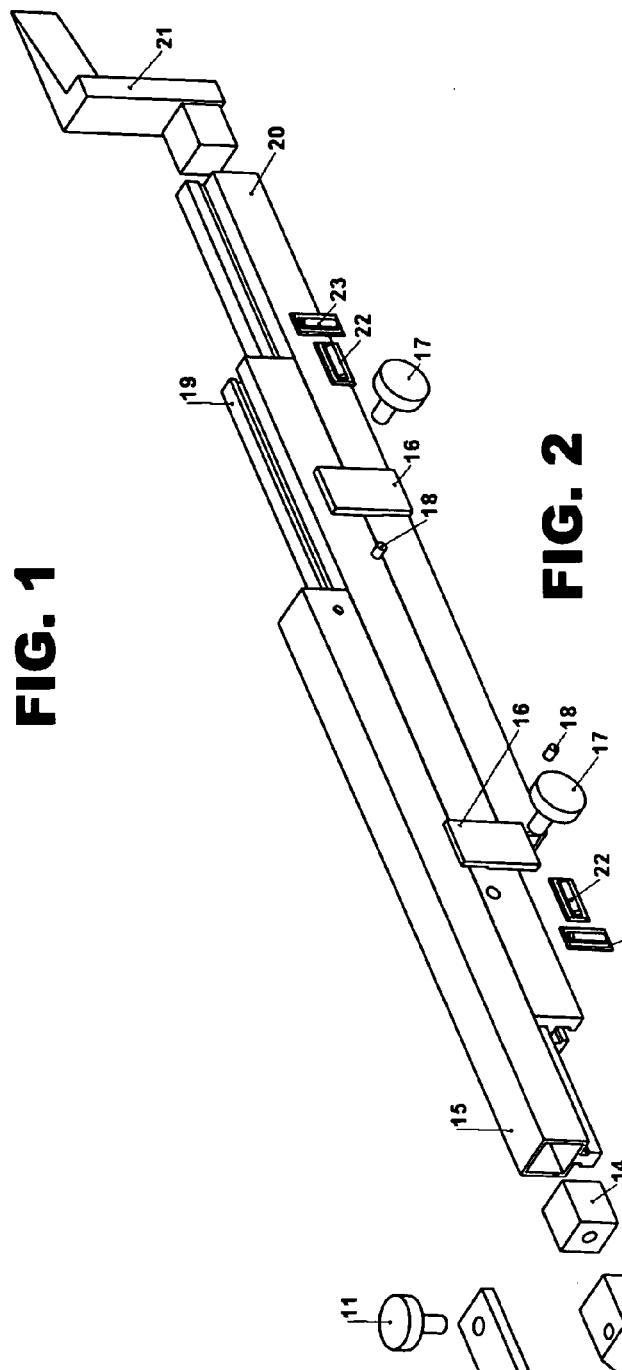
FIG. 1
FIG. 2

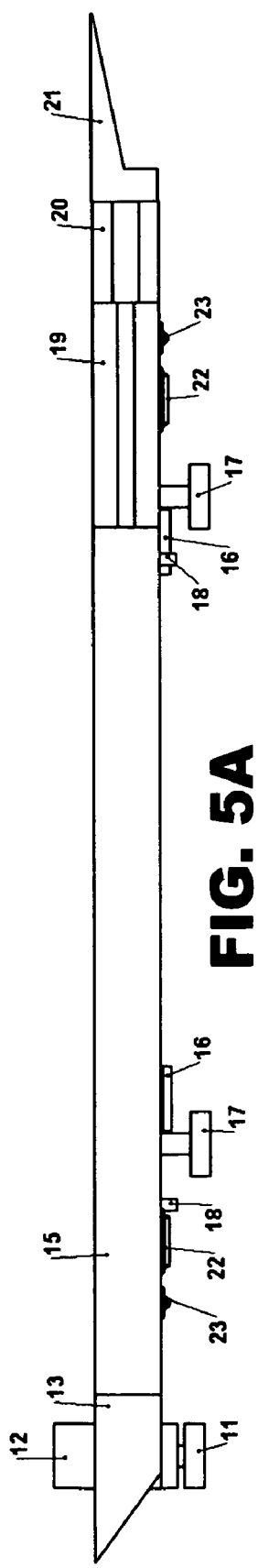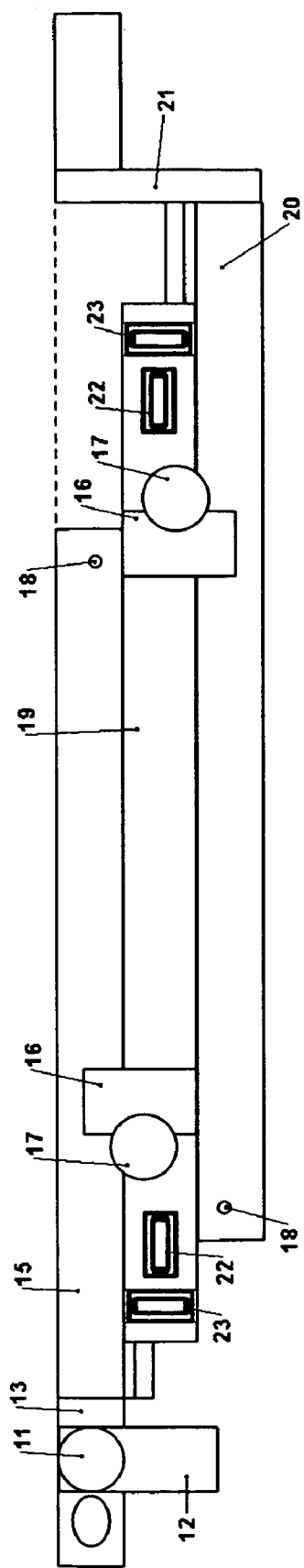

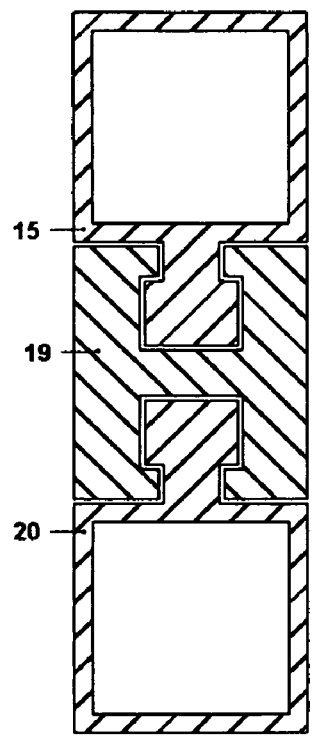 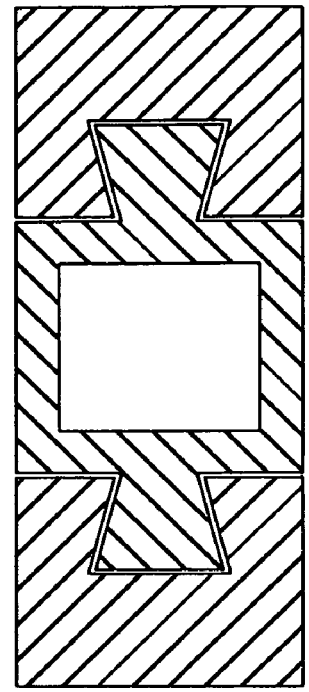
FIG. 7A  FIG. 7B
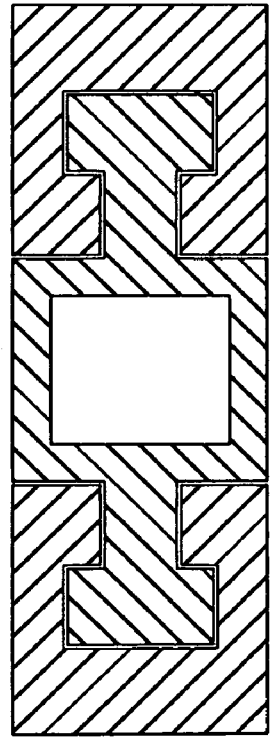 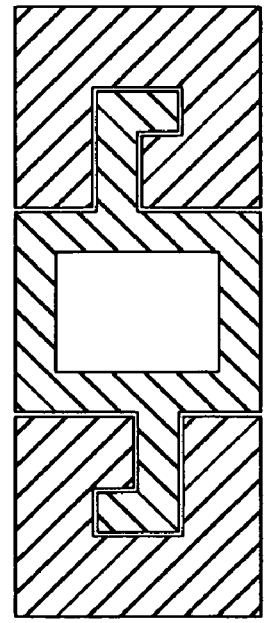
FIG. 7C  FIG. 7D

CUT LENGTH INDICATOR

CROSS-REFERENCE TO RELATED APPLICATIONS

This application claims the benefit of provisional patent application Ser. No. 61/010,817 filed on Jan. 11, 2008.

FEDERALLY SPONSORED RESEARCH

Not Applicable

SEQUENCE LISTING OR PROGRAM

Not Applicable

BACKGROUND

1. Field

This invention relates to a mechanical tool that provides for both an accurate and easy means for determining and transferring a linear distance between two points, two planes, or one point and one plane. This established distance is typically transferred onto an object such, as trim moldings, for providing a cut mark, which in turn will result in a tight fit installation.

2. Prior Art

In the wood trimming business, as like many other businesses, it is very important to work as efficiently as possible. Much time can be wasted in determining an accurate linear cut length to result in a piece of molding fitting tightly at the location where it is installed. Presently, the tape measure is used to perform this operation. However, the tape measure has several flaws. Firstly, the tape measure does not bend sharply into corners. Secondly, the obtained measurement is often forgotten by the time the measurement needs to be reproduced. Thirdly, an accurate measurement is hard to read. Fourthly, the tape measure's catch, because it is permanently attached, can add to measurement error. Fifthly, the tape measure tends to sag when extended to over 7 feet since it is not self-supporting.

When using the Cut Length Indicator for marking trim moldings for cutting purposes, a finish carpenter would not have to be concerned with remembering or reproducing a numerical measurement. It is for this reason the Cut Length Indicator has no numerical scale. When cutting moldings for installation, the carpenter only needs to be concerned with the physical location where the cut must be made.

One or more angularly shaped rotating component abutting ends allows the invention to contour to surfaces with various profiles typically found on crown, base, and chair-rail moldings. The angled end shape allows the invention to get into tight corners. When a distance is being established between two points, two planes or one point and one plane, an L-shaped movable catch allows a user to position said catch out of the way so as to not obscure the distance being established. To ensure the most accurate distance is established, the invention's abutting ends are aligned along the same reference plane and can be aligned longitudinally. Level bubble vials are attached to the invention to provide for vertical and horizontal leveling.

| | | | |
|---|---|---|---|
| 5,735,058 | April 1998 | Jimenez | 33/809 |
| 6,820,342 B2 | November 2004 | Ramsthaler | 33/41.4 |
| 4,621,431 | November 1986 | Fatool et al. | 33/161 |
| 2,232,824 | February 1941 | Maher | 33/161 |
| 2,356,544 | August 1944 | Swanson | 33/161 |
| 3,808,690 | May 1974 | Balder | 33/1 CC |
| 6,836,969 B1 | January 2005 | Bates | 33/42 |
| 6,047,478 | April 2000 | Sowers | 33/379 |

This listed prior art does not solve all the issues that the Cut Length Indicator does, more specifically, operating in different planes, reaching into tight corners, aligning longitudinally, providing a detachable moveable catch, no memorizing of numerical measurements, disallowing separation of structure unless specifically desired, and locking at any linear position within the limits of operation.

SUMMARY

The present invention provides a tool for accurately determining a distance between two points, two planes, or one point and one plane, and transferring said distance without having to establish a numerical measurement.

DRAWINGS

FIG. 1 is a front view of the invention fully retracted.

FIG. 2 is an exploded isometric view of the invention.

FIG. 5A shows a top view of the invention lined up along the same plane.

FIG. 5B shows a front view of the invention where opposing abutting ends are aligned longitudinally.

FIG. 7A shows a cross-sectional view of the preferred embodiment of an H-shaped main body chassis with T-shaped rails.

FIG. 7B shows a cross-sectional view depicting an alternate embodiment of a dovetail chassis configuration.

FIG. 7C shows a cross-sectional view depicting an alternate embodiment of a T-shaped chassis with C-shaped rails.

FIG. 7D shows a cross-sectional view depicting an alternate embodiment of an L-Shaped chassis.

DRAWINGS—LIST OF REFERENCE NUMERALS

Figure 3:
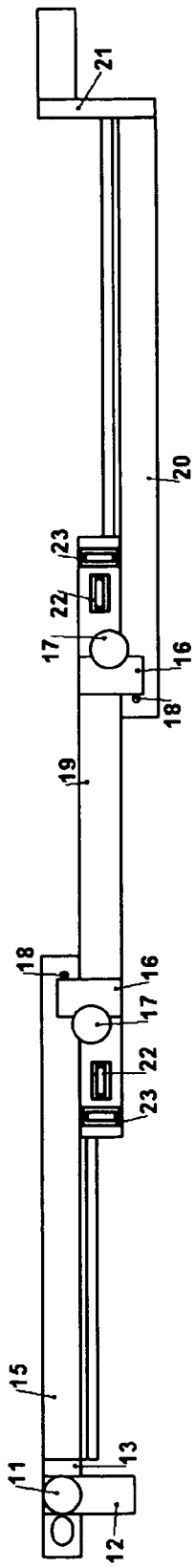
FIG. 3 shows the invention fully extended with extension stops engaged preventing longitudinal separation.

10 Oval Head Screw
11 Shoulder Thumb Screw
12 L-Shaped Movable Catch
13 Rotating Component
14 Tapped Transition Block
15 Top Rail
16 Extension Stop 17 Locking Thumbscrew
18 Stop Bolt
19 Main Body Chassis
20 Bottom Rail
21 Abutting Angled End
22 Horizontal Bubble Vial
23 Vertical Bubble Vial

DETAILED DESCRIPTION OF THE INVENTION

One embodiment of the present invention is illustrated in FIG. 2, an exploded isometric view. The main body of FIG. 2 comprises a series of sliding rails, a top rail 15, a main body chassis 19, and a bottom rail 20. Locking thumbscrews 17 are threaded through main body chassis rail 19. Extension stops 16 are secured to main body chassis 19 using commonly available threaded hardware. Removable stop bolts 18 are threaded to both top rail 15 and bottom rail 20. Abutting angled end 21 is secured to bottom rail 20 either via a press fit or by the use of commonly available threaded hardware. Tapped transition block 14 is secured to top rail 15 either via a press fit or by the use of commonly available threaded hardware. Rotating component 13 is attached to tapped transition block 14 by a commonly available oval head screw 10 and applied thread lock. The oval head screw 10 is torqued, ensuring static positioning and free rotation of rotating component 13. L-shaped movable catch 12 is mounted to rotating component 13 via a shoulder thumbscrew 11. Bubble vials 22 and 23 are attached onto main body chassis 19 via self-adhering tape or via commonly available threaded hardware. FIG. 1 shows the device in a fully collapsed position.

OPERATION OF THE INVENTION

Figure 4:
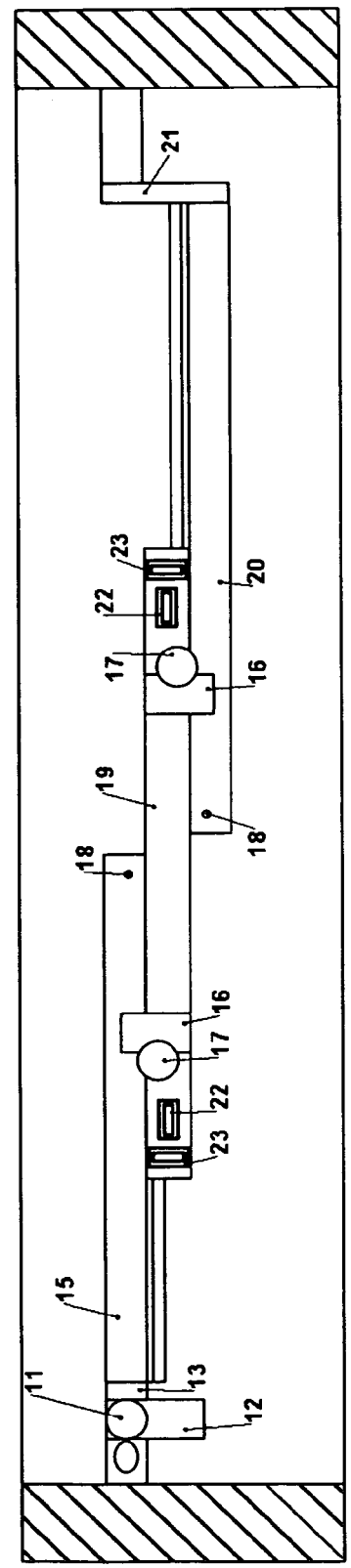
FIG. 4 shows the invention abutted between two planes with an L-shaped moveable catch rotated in a position so as not to add any error to the distance being established.

In operation, L-shaped movable catch 12 is loosened to swivel out of the way of the rotating component 13. The invention is then positioned between two points, two planes, or one point and one plane. Top rail 15 and bottom rail 20 are slid in opposing directions on main body chassis 19 until abutting angled end 21 and rotating component 13 abuts or is positioned to mate with the two points, two planes, or one point and one plane. Once abutted or positioned, thumbscrews 17 are tightened and a distance is properly represented by the invention. FIG. 4, shows the invention abutted between two planes with L-shaped movable catch 12 rotated out of the way.

As an alternate method, prior to placing the invention in position, the top rail 15 or bottom rail 20 can be tightened to main body chassis 19 using thumbscrew 17. Once the tightened rail is placed in position, only the free rail needs to be slid and abutted or positioned to the opposing desired location.

Extension stops 16 along with stop bolts 18 prevent the longitudinal separation of the invention. Assuming a large enough distance exists between the two points, two planes, or one point and one plane, extension stops 16 along with stop bolts 18 can be used to re-extend the invention to a given length. This is accomplished by fully extending either top rail 15 or bottom rail 20 until its stop bolt 18 makes contact with its mating extension stop 16 and the appropriate thumb screw 17 is tightened. The free rail is then slid, abutted or positioned, and tightened to the opposing desired location. The fully extended rail is then completely collapsed as for transportation purposes. Just prior to initiating the process for distance transferring, the fully collapsed rail is completely re-extended by using the stop bolt 18 and extension stop 16 as a guide. FIG. 3 shows the invention fully extended.

Figure 6:
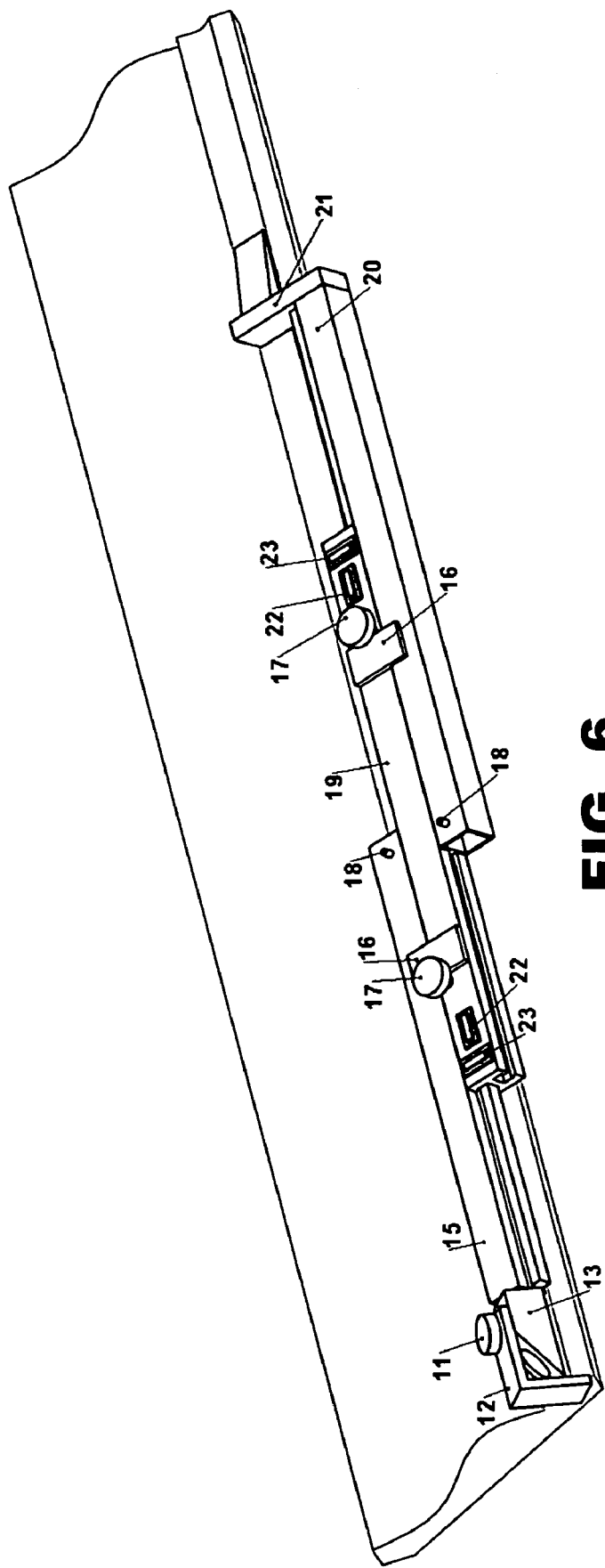
FIG. 6 shows an L-shaped moveable catch along with a rotating component rotated and hooked to the contour of a piece of crown molding.
Figure 8A:
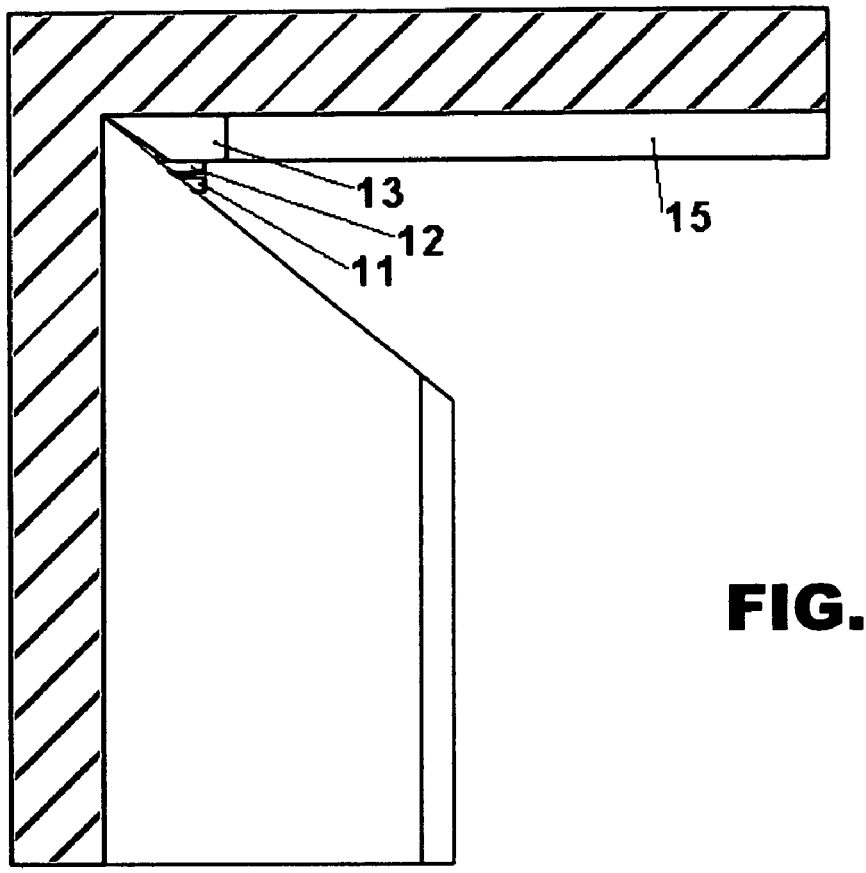
FIG. 8A shows a top view of the invention where an abutting angled end is abutting in the tight space of a mitered crown molding.
Figure 8B:
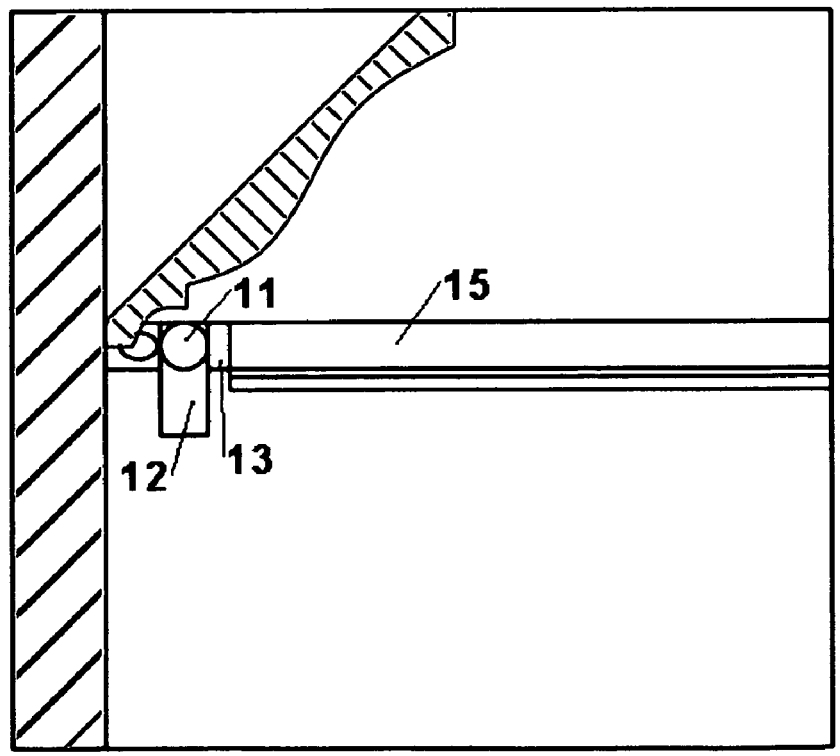
FIG. 8B shows a front view of the invention where an abutting angled end is abutting in the tight space of a mitered crown molding.
Figure 9:
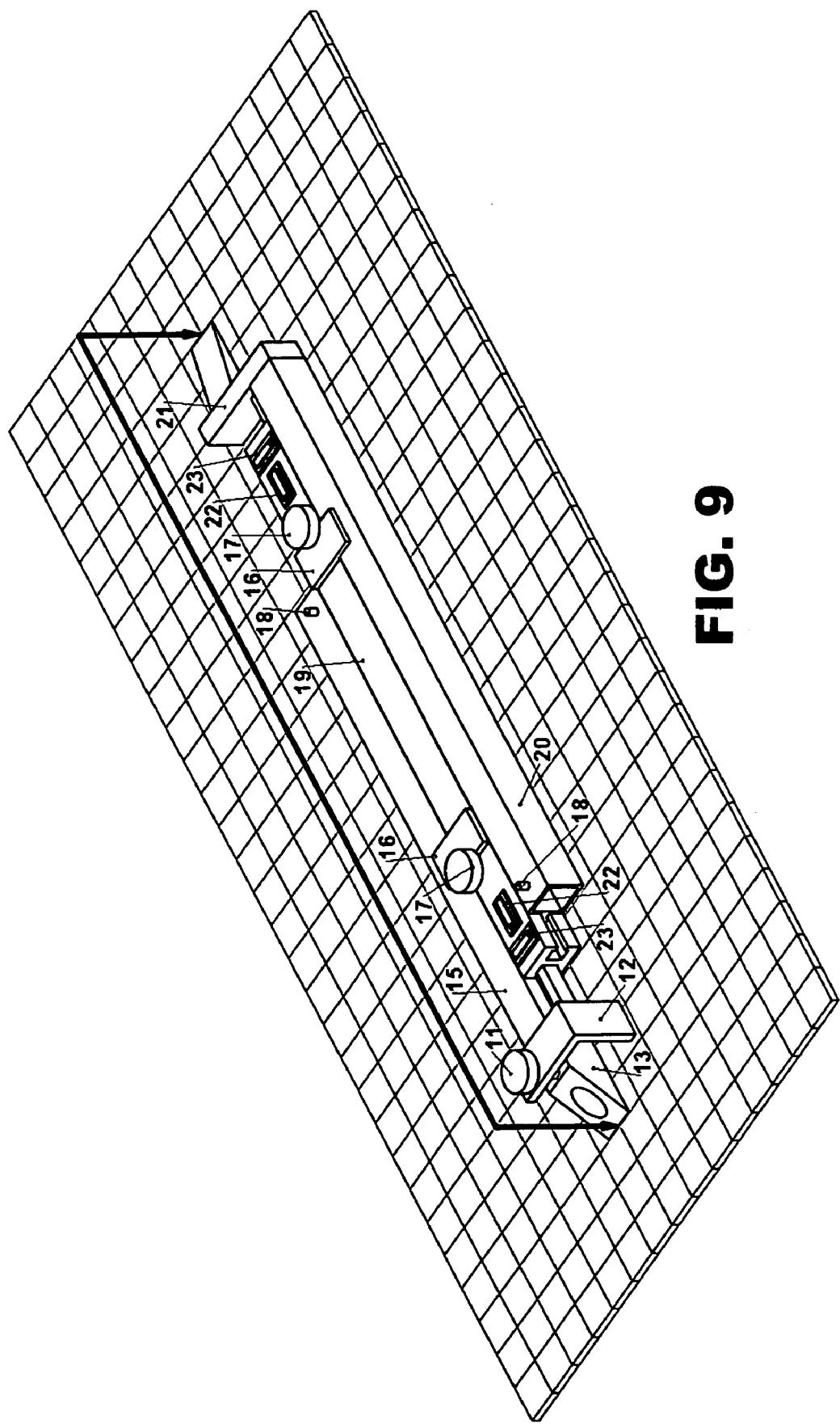
FIG. 9 shows an isometric view of the device lying flat on a plane with coplanar rail opposing abutting ends that are coplanar and are aligned longitudinally.

Once the distance transfer process is initiated, L-shaped movable catch 12 is positioned in front of the rotating component 13 and then tightened using shoulder thumbscrew 11. The invention is then placed on an object receiving the distance transfer mark. The rotating component 13 is then rotated to best match the contour of the object. FIG. 6 shows the invention in place with L-shaped movable catch 12 hooked onto a piece of crown molding and the rotating component 13 is rotated to fit the contour of the molding. A cut mark is then drawn on the object at the very end of abutting angled end 21.

If horizontal or vertical leveling is desired, horizontal bubble vials 22 and vertical bubble vials are 23 are provided.

DESCRIPTION OF ALTERNATE EMBODIMENTS

Since the main body of this invention comprises a plurality of interconnected sliding rails, any configuration that facilitates this should provide an adequately functioning tool. Examples of different functional cross-sections are shown in FIGS. 7A-7D. FIG. 7A depicts the preferred embodiment of an H-shaped main body chassis with T-shaped rails. FIG. 7B depicts an alternate embodiment of a dovetail chassis configuration. FIG. 7C depicts an alternate embodiment of a T-shaped chassis with C-shaped rails. FIG. 7D depicts an alternate embodiment of an L-Shaped chassis.

FIG. 7A, "H Cross-Sectional Preferred Embodiment" was selected as the preferred embodiment because it easily and inexpensively allows a locking device to be located on the main body chassis of the embodiment. Additionally, if further extension of this design becomes desirable, additional rails can easily be fabricated to fit inside the squarely shaped top and bottom rail.

Alternate hardware to extension stop 16 and stop bolt 18, such as a spring mechanism, can be used to prevent the overextension of the rails, but was considerably more expensive to design into the invention.

Other locking mechanisms can be used in lieu of thumbscrew 17 such as a cam clamp, but the thumbscrew 17 was considered the best choice based on availability, cost and functionality.

The invention claimed is:
1. A self-supporting distance transfer device comprising:
a) a plurality of parallel rails that independently slide in the same or in opposite directions;
b) a coplanar rail for determining a distance transfer, adjacent one of the parallel rails and having opposing abutting ends wherein at least one of said ends is a rotating component attached to at least one of the said rails such that said component spins concentrically with respect to the component's opposing abutted end;
c) locking hardware to prevent said rails from sliding; and
d) one of the parallel rails including a main body chassis wherein said rails and said chassis are interconnected by said chassis having an H-shaped cross-section and said rails having a T-shaped cross-section.
2. The self-supporting distance transfer device of claim 1 wherein said abutting ends can be aligned longitudinally.
3. The self-supporting distance transfer device of claim 1 wherein said abutting ends are shaped at an angle allowing for abutting in tight spaces.

4. The self-supporting distance transfer device of claim 1 further comprising a plurality of extension stops to prevent said rails from longitudinally separating from said chassis.

5. The self-supporting distance transfer device of claim 1 wherein said locking hardware is further defined as a plurality of locking screws mounted through said chassis wherein said screws engage and disengage said rails.

6. The self-supporting distance transfer device of claim 1 wherein said rotating component further comprising an L-shaped movable catch.

7. The self-supporting distance transfer device of claim 1 further comprising one or more horizontally oriented bubble vials.

8. The self-supporting distance transfer device of claim 1 further comprising one or more vertically oriented bubble vials.

* * * * *